United States Patent [19]
Lawson et al.

[11] Patent Number: 6,084,061
[45] Date of Patent: Jul. 4, 2000

[54] REMOVAL OF ANTHRAQUINONE FROM TALL OIL AND TALL OIL FRACTIONS

[75] Inventors: Nelson E. Lawson; Gregory S. Gorman, both of Savannah, Ga.

[73] Assignee: Arizona Chemical Corporation, Jacksonville, Fla.

[21] Appl. No.: 09/231,742

[22] Filed: Jan. 15, 1999

[51] Int. Cl.[7] .................................. C09F 7/00; C02F 1/28
[52] U.S. Cl. ............................................ 530/230; 210/694
[58] Field of Search .............................. 530/230; 210/694

[56] References Cited

U.S. PATENT DOCUMENTS 3,638,399 2/1972 Walker .
4,197,168 4/1980 Evans .
5,021,164 6/1991 Gay .

*Primary Examiner*—Nathan M. Nutter
*Attorney, Agent, or Firm*—Seidel, Gonda, Lavorgna & Monaco, PC

[57] ABSTRACT

Anthraquinone is removed from tall oil or tall oil fraction by adsorption with activated carbon. The process is particularly useful in the removal of anthraquinone from tall oil heads.

14 Claims, No Drawings

REMOVAL OF ANTHRAQUINONE FROM TALL OIL AND TALL OIL FRACTIONS

FIELD OF THE INVENTION

The invention relates to the processing of tall oil and fractions thereof, and the tall oil heads fraction in particular.

BACKGROUND OF THE INVENTION

In the kraft paper pulping process, wood chips of coniferous trees are fed into a digester and a "white" cooking liquor containing sodium hydroxide and sodium sulfide is added. The contents are heated according to a predetermined schedule to complete the cooking reaction whereby resin acids and fatty acids are released from the wood chips and saponified. The resulting cooked pulp is separated from the residual cooking liquor, known as "black liquor". The sodium salts of the resin acids and fatty acids, commonly referred to as tall oil soap or "black liquor soap", are suspended in the black liquor. The tall oil soap is then recovered from the kraft black liquor by any one of various techniques known to those skilled in the art. The separated tall oil soap is treated with sulfuric acid to form crude tall oil. The main components of crude tall oil are fatty acids, rosin, and unsaponifiables. The crude tall oil can be further refined by vacuum fractionation to form tall oil fatty acids and tall oil-based rosin acids. The fatty acids and rosins are used in a variety of applications, such as the preparation of polyamides, rosin resins, adhesives and epoxy compositions.

In the processing of tall oil for the recovery of useful products, the oil is typically subjected to fractionation to separate various components. The fractional distillation of crude tall oil is accomplished in a multi-column configuration using high temperature and low partial pressures. In a first column, known as a "pitch stripper" or "depitching column", the fatty acids and rosin are removed together as a distillate stream with pitch as the bottoms product. A heads cut may also be taken in this first column. The distilled tall oil, a mixture of fatty acids and rosin, is fed to a fractionating column chain consisting of two or three columns in series where four fractions are generally taken: heads cuts; a pure, distilled tall oil fatty acids cut; a mixed fraction (25–30% rosin); and tall oil rosin.

Both the initial heads cut from the depitching column, and the subsequent heads cut from the fractionating columns, is referred to hereinafter collectively as "tall oil heads".

Tall oil heads are typically composed of 50–75% of a mixture of fatty acids comprising palmitic, oleic and linoleic acids. The remainder consists generally of unsaponifiable materials. The unsaponifiable material in tall oil include diterpene alcohols, aldehydes and hydrocarbons, sterols, fatty and wax alcohols, stilbenes, and other compounds. Palmitic acid is a major component of tall oil heads. Thus, heads tend to be soft solids at ambient temperature as the result of the high melting point (63° C.) of palmitic acid. Tall oil heads are used as floatation agents that are used in agricultural emulsifiers, drilling fluids, soaps, and waterproofing agents, and as a source of palmitic acid. When admixed with distilled tall oil, tall oil heads can be used to make polyalkylene polyamide condensates that are used as corrosion inhibitors, as cationic flotation collectors and as asphalt emulsifiers.

Anthraquinone is used as a pulping catalyst in the pulping process. Anthraquinone has the effect of decreasing pulping times and improving yields of cellulosic materials from the pulping operation. Anthraquinone is typically introduced into pulping operations as a 50% water slurry, or as a neat powder. Much of the anthraquinone remains in the black liquor. As the black liquor is concentrated prior to burning in the kraft recovery boiler, the tall oil soap containing much of the anthraquinone separates. The tall oil soap is converted to tall oil by acidulation with, for example, sulfuric acid. Tall oil can contain as much as 1500 parts per million of anthraquinone or more. Anthraquinone concentrates in tall oil heads during distillation and can reach a concentration of 1.5 wt. % or more.

Anthraquinone is a solid at standard temperature and pressure, and sublimes from a solid to a gas at elevated temperature. During the fractionation of crude tall oil, anthraquinone collects and sublimes at the top of the fractionation tower. The more efficient the fractionation tower, the higher will be the concentration of anthraquinone at the tower top.

If the tall oil heads are cooled, the anthraquinone crystallizes, causing pluggage of coolers and associated equipment, which can force the entire distillation operation to be shut down for cleaning. Moreover, the high concentration of anthraquinone in tall oil heads may render the heads unsuitable for some purposes. Tall oil heads with a high anthraquinone content may cause anthraquinone contamination of the environment if used as a floatation collector additive.

U.S. Pat. No. 4,197,168 describes a fractional distillation process for removal of anthraquinone from tall oil heads. Pitch-stripped crude tall oil is distilled at reduced pressure (from about 25 torr at the top of the column) and a temperature of about 215° C. to 290° C. A heads cut taken from the top of the column contains about 80% of the anthraquinone admitted to the distillation column in the pitch-stripped crude tall oil. The anthraquinone-containing tall oil heads product contains from about 5% to 95% anthraquinone, 5% to 75% heads fatty acids, and 2.5% to 25% unsaponifiables. U.S. Pat. No. 4,197,168 states that the anthraquinone-containing tall oil heads fraction may be recycled to pulping operations or can be further rectified by further fractional distillation to provide a refined product further enriched in anthraquinone.

U.S. Pat. No. 4,197,168 purports to obtain tall oil heads cuts with at least 5% anthraquinone, up to as much as 95% anthraquinone. However, anthraquinone concentrations even as low as 1.4% in the heads fraction, and possibly lower depending on the distillation conditions, are problematic in that anthraquinone crystallizes upon cooling. The precipitated anthraquinone resists pumping and thereby upsets the reflux section of the distillation operation.

On the other hand, tall oil heads fractions with anthraquinone concentrations less than 10%, more typically less than 5%, can not serve as anthraquinone sources for pulping operations without further concentration, even though tall oil heads are otherwise compatible with pulping. (The heads fraction does not contain any components which would interfere with pulping.) Pulping operations utilize anthraquinone in the form of a 50% water slurry, added to the pulping mixture at a rate of about 0.65 pounds of slurry per ton of oven dried wood. Use of a tall oil heads cut containing 5% anthraquinone, or even 10% anthraquinone, as a pulping additive would leave the pulping mixture too dilute.

What is needed is an efficient method for removing anthraquinone from tall oil or tall oil fractions, particularly from tall oil heads. Removal of anthraquinone from tall oil heads avoids equipment plugging caused by anthraquinone solidification during tall oil heads processing. Removal of anthraquinone from tall oil heads also eliminates anthraquinone environmental contamination particularly where the heads are used as floatation agents which may be released into the environment. A process which not only removes anthraquinone, but also concentrates the same in a usable form, would be advantageous as a generator of anthraquinone for pulping operations.

SUMMARY OF THE INVENTION

According to the present invention, it has been found that anthraquinone may be removed from tall oil or an anthraquinone-containing fraction of tall oil, such as tall oil heads, by contact with activated carbon. The activated carbon adsorbs anthraquinone from the tall oil or tall oil fraction.

By "tall oil fraction" is meant any material or mixture of materials derived directly or indirectly from crude or distilled tall oil by fractional distillation or other manipulation designed to enrich for one or more selected components of tall oil. The activated carbon is preferably contained in a bed, and the tall oil or tall oil fraction is passed through the bed. The bed effluent is then collected. The effluent containing anthraquinone may then be concentrated to provide a usable source of concentrated anthraquinone, such as a pulping additive. If desired, the anthraquinone may be precipitated from the effluent, and then collected by filtration.

DETAILED DESCRIPTION OF THE INVENTION

The treatment according to the present invention efficiently removes anthraquinone from the feed material. The adsorbed anthraquinone may then be released from the activated carbon and recycled to the paper pulping process as a pulping catalyst. Recovery of anthraquinone, thereby reducing its concentration in tall oil and tall oil heads, eliminates equipment plugging due to anthraquinone crystallization. Reducing the anthraquinone contamination in tall oil heads also reduces the risk of anthraquinone environmental contamination, particularly when the heads are used as floatation collector additives.

Importantly, the recovered anthraquinone need not be pure for recycle to the pulping process. Minor amounts of heads component contaminating the recycled anthraquinone would not have a deleterious impact on the pulping process, and may even aid in pulping somewhat, due to the surfactant action of the heads component.

Activated carbon is a well-known form of carbon characterized by high absorptivity for many gases, vapors, organic compounds and colloidal solids. According to the present invention, activated carbon has been found to exhibit a high selectivity for anthraquinone when used to purify tall oil or tall oil fractions containing anthraquinone. In particular, it was observed that the concentration of fatty acids in tall oil heads is unchanged upon treatment with activated carbon, while the concentration of anthraquinone was reduced to a level below the limit of detection of gas chromatography. Thus, the present invention provides a method for the selective recovery of anthraquinone from tall oil and tall oil fractions, particularly tall oil heads.

Activated carbon is typically obtained by the destructive distillation of wood, nutshells, animal bones, or other carbonaceous material. The carbon is "activated" by heating to 800–900° C. with steam or carbon dioxide, which results in a porous internal structure. The internal surface area of activated carbon averages approximately 10,000 square feet per gram. The density typically ranges from 0.08 to 0.5. The material is usually employed as a finely divided powder having a particle size of about 10 to about 200 mesh. An activated carbon having of from about 12 to about 40 mesh has been found to be particularly effective in the practice of the present invention.

Activated carbon may be utilized to recover anthraquinone from tall oil (either crude or refined), as well as any fraction of tall oil which contains recoverable anthraquinone. Most preferably, anthraquinone is recovered from tall oils heads, owing to the high concentration of anthraquinone in the heads.

According to one embodiment of the invention, activated carbon, is contained in a bed housed in a column through which the tall oil or tall oil fraction is flowed. The column should be maintained at a temperature above the melting point of the tall oil or tall oil fraction to ensure that the inputted material remains liquid. Preferably, the column temperature should be maintained at a temperature from about 10° C. to about 20° C. above the melting point of the tall oil or tall oil fraction. For tall oil heads, the column temperature should be at least about 50° C. Preferably, the temperature is from about 50° C. to about 100° C., more preferably from about 60° C. to about 80° C. A temperature of about 70° C. is particularly preferred. The column effluent, which has a concentration of anthraquinone reduced from the concentration contained in the input liquid, is collected.

The column effluent may be monitored continuously or intermittently for anthraquinone content. The effluent anthraquinone content may be measured by any of the known analytical methods available for determining the anthraquinone content of organic mixtures. One such analytical method is ultraviolet (UV) spectroscopy. The UV signature of anthraquinone has been reported. See, for example, *Organic Electronic Spectral Data,* Interscience Publishers, Inc., New York, N.Y., Vol. I, 1946–53, p. 545, incorporated herein by reference.

Alternatively, anthraquinone monitoring may take the form of colorimetric detection of the anthraquinone reduction product, anthrahydroquinone. See, for example, Feigl, *Spot Tests in Organic Analysis,* 7th English edition, Elsevier Scientific Publishing Co., New York, N.Y., 1966, p.336–37, incorporated herein by reference. The aqueous solution of the alkali salts of anthrahydroquinone is faintly red in the cold and deep red when heated. The salts are easily reoxidized to anthraquinone upon contact with air. However, when an alkaline solution containing an excess of sodium hydrosulfite ($Na_2S_2O_4$) is used as a reductant, the autoxidation reaction is inhibited. Hence, a sensitive test for anthraquinone involves diluting a sample of the column effluent in a strongly alkaline solution, and adding sodium hydrosulfite with heating. By varying the dilution of the sample and selecting the appropriate controls, one may devise a test which gives a positive result (red color) for a particular desired anthraquinone concentration.

Regardless of the method used to test for anthraquinone, the appearance of significant amounts of anthraquinone in the column effluent indicates that the activated carbon in the column is saturated, thereby requiring switching to another column, elution of anthraquinone and column regeneration.

Column regeneration may be achieved in any of several ways. The column may be washed with an anthraquinone-eluting solvent. Any solvent capable of dissolving the anthraquinone captured on the column, but not the adsorbent, may be utilized. Anthraquinone may then be recovered from the eluting solvent by evaporating off the solvent. According to one preferred embodiment of the invention, the anthraquinone captured on the column is eluted with an eluting solvent comprising sodium hydroxide, or "white liquor". The latter is a mixture of sodium hydroxide and sodium sulfide. The anthraquinone which elutes from the column may do so in the form of a mono or disodium salt. The column eluate is sufficiently enriched in anthraquinone that it may be transported to pulp mills and added directly to pulping digestors. If the anthraquinone mono or disodium salt is not desired, the eluate may be acidified to convert the anthraquinone to the free form. The anthraquinone, which precipitates from the eluate, may be collected by filtration.

The anthraquinone may also be reduced either chemically or electrochemically to its dihydro form. One or more chemical reducing agents may be employed. Such reducing agents include, for example, alkaline solutions of sodium dithionite, sodium borohydride, lithium aluminum hydride, lithium borohydride, diborane, aluminum alkoxides and diisobutyl aluminum hydride. The reduction step may be accomplished in one or more steps using a suitable solvent.

The eluting solvent can be removed from the column by washing with another solvent, washing with water, hot air or nitrogen purging, or other methods known to those skilled in the art. Other means of carbon column regeneration may include extraction with supercritical $CO_2$ or sublimation with superheated steam or hot nitrogen. Carbon reactivated in this manner may be returned to the carbon bed and used in the process of the invention to adsorb additional anthraquinone.

The activated carbon bed is advantageously contained in a vertical column, and the tall oil or tall oil fraction is allowed to flow therethrough by the force of gravity. A positive pressure may also be utilized. The flow through the bed may be vertical or horizontal. For a horizontally disposed bed, the tall oil or tall oil fraction must be pumped through the bed. The pumping pressure should be select to obtain a flow rate which provides for a contact time with the activated carbon bed sufficient to result in substantial adsorption of anthraquinone from the source liquid.

According to another embodiment, activated carbon is mixed with the tall oil or tall oil fraction. The activated carbon having anthraquinone adsorbed thereon is separated from the tall oil or tall oil fraction by conventional filtration techniques. The activated carbon is regenerated by inducing release of adsorbed anthraquinone by any of the methods described above.

The level of anthraquinone remaining in the tall oil or tall oil fraction after adsorption treatment with activated carbon may be selected according to the end use of the tall oil or tall oil fraction. For some applications, an anthraquinone concentration of as high as 600 ppm may be tolerated. For other applications, an anthraquinone concentration of no more than 450 ppm is desirable. Preferably, the anthraquinone concentration remaining in the tall oil or tall oil fraction following adsorption with activated carbon is not more than 50 ppm, which is the limit of the gas chromatographic detection of anthraquinone.

The practice of the invention is illustrated by the following nonlimiting example.

EXAMPLE 1

A six ml polypropylene solid phase extraction cartridge was filled to 90% capacity with activated carbon and preheated to 70° C. To this was added a 1 gram sample of liquid tall oil heads at 70° C. The activated carbon was CECARBON GAC1240, Elf Atochem North America, Inc. (12×40 mesh). The tall oil heads sample added to the cartridge contained 701 ppm anthraquinone (determined by gas chromatography) before adsorption by the activated carbon. A slight positive pressure was applied to the top of the cartridge to begin the flow of the tall oil heads through the activated carbon bed, and to wet the bed. The positive pressure was discontinued, and the balance of the tall oil heads was allowed to flow through the bed under the influence of gravity. The cartridge effluent was determined free of anthraquinone by gas chromatography analysis (limit of anthraquinone detection=100 ppm).

The present invention may be embodied in other specific forms without departing from the spirit or essential attributes thereof and, accordingly, reference should be made to the appended claims, rather than to the foregoing specification, as indicating the scope of the invention.

All references cited herein with respect to synthetic, preparative and analytical procedures are incorporated herein by reference.

What is claimed is:

1. A process for removing anthraquinone from tall oil or fraction thereof comprising contacting said tall oil or tall oil fraction with activated carbon to adsorb anthraquinone therefrom.

2. A process according to claim 1 for separating anthraquinone from a tall oil fraction comprising tall oil heads.

3. A process according to claim 1 wherein the activated carbon is contained in a bed, and the tall oil or fraction thereof is passed through the bed.

4. A process according to claim 3 wherein the temperature of the tall oil or tall oil fraction is from about 50° C. to about 100° C.

5. A process according to claim 3 wherein tall oil or tall oil fraction is passed through the bed until anthraquinone appears in the bed effluent, indicating that the bed has become saturated with anthraquinone.

6. A process according to claim 5 further comprising regenerating the activated carbon bed to release the anthraquinone adsorbed thereon.

7. A process according to claim 6 wherein the activated carbon bed is regenerated by treatment with a regenerating solution comprising sodium hydroxide.

8. A process according to claim 7 wherein the regenerating solution comprises a mixture of sodium hydroxide and sodium sulfide.

9. A process according to claim 1 wherein the anthraquinone concentration in the tall oil or tall oil fraction is reduced by contact with said activated carbon to not more than about 100 parts per million.

10. A process according to claim 1 wherein the tall oil or fraction thereof is mixed with the activated carbon to permit adsorption of anthraquinone thereon, and activated carbon having anthraquinone adsorbed thereon is separated from the tall oil or tall oil fraction.

11. A process according to claim 10 wherein the activated carbon having anthraquinone adsorbed thereon is separated from the tall oil heads by filtration.

12. A process for removing anthraquinone from tall oil heads comprising passing tall oil heads through a bed of activated carbon.

13. A process according to claim 12 wherein the anthraquinone concentration in the tall oil or tall oil fraction is reduced by contact with said activated carbon to not more than about 100 parts per million.

14. A process according to claim 12 wherein the temperature of the tall oil or tall oil fraction is from about 50° C. to about 100° C.

* * * * *